3,405,080
PROCESS FOR PREPARING POLYETHER-POLY-URETHANE-STARCH RESINS
Felix H. Otey, Florence L. Bennett, and Charles L. Mehltretter, Peoria, Ill., assignors to the United States of America as represented by the Secretary of Agriculture
No Drawing. Filed Oct. 7, 1965, Ser. No. 493,938
1 Claim. (Cl. 260—9)

ABSTRACT OF THE DISCLOSURE

Low cost polyether-urethane parts for small machines, chair legs, and the like are obtained by pressure molding an unfoamed diisocyanate modified glycol glycoside polyether prepolymer of which prepolymer about one-half to about two-thirds of the total weight represents directly added starch.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to novel starch-containing, pressure-molded polyether-polyurethane resins. More particularly it relates to smoothly machinable polyurethane resin products formed by pressure molding a mixture of a polyether polyurethane prepolymer and granular starch in which the polyurethane prepolymer is made by reaction of a polyether with an organic diisocyanate as described in U.S. Patent No. 3,165,508.

Polyurethane polymers prepared by reacting diisocyanates with polyol derived polyethers are widely used for the production of rigid, semirigid, and flexible foams. They are also valuable as elastomeric materials that are generally made by reacting a suitable polyether or a polyester with an organic diisocyanate such as toluene diisocyanate to yield elastomers which are cured by addition of more of the diisocyanate and heating the resulting mass under pressure A principal object of our invention is the preparation of novel polyether-polyurethane polymers integrally containing starch in granular form as a low cost reactive or partially reactive filler whereby, in the presence of heat and pressure, the starch filler through its hydroxyl groups combines chemically with the polyurethane as a crosslinking and curing agent. Another object is the provision of uncured mixtures in the form of pastes or doughs that with the accompaniment of only mild heat can be pressure molded to yield highly cured, machinable polyurethane resin having sufficient hardness and mechanical strength for the manufacture of small machine parts such as gears and the like, nonscratch furniture legs, etc.

In the practice of our invention we intimately mix 1 to 1.9 parts by weight of starch with 1 part by weight of a prepolymer formed by reacting a suitably polyoxyalkylated polyol and a diisocyanate and then mildly heating the viscous mass while subjecting it to a pressure of about 10,000 p.s.i. to effect reaction between the starch and the uncured diisocyanate-modified polyether product. The temperatures of mixing and reacting the starch and polyurethane prepolymer range from 70° C. to about 100° C. If desired, additional diisocyanate may be admixed with the starch-prepolymer mixture prior to molding under pressure. The additional diisocyanate probably reacts with the starch to produce added crosslinking.

The prepolymer is prepared by combining 3.5 to 5.0 moles of tolylene diisocyanate with 1 mole of a polyether having a hydroxyl number of about 72 to 422, with stirring and heating at 70° C. to 100° C. for about 30 minutes. As is well known, the desired polyether is prepared by reacting a calculated amount of alkylene oxide with a polyol such as sorbitol, sucrose, methyl glucoside, or glycol glycoside in the presence of a catalytic amount of alkali metal hydroxide.

The organic diisocyanate is not limited to tolylene diisocyanate but includes toluene diisocyanate, polymethylene polyphenyl diisocyanate, p-phenylene diisocyanate, and the like.

The proportions of starch and uncured polyurethane prepolymer is preferably about 100 to 190 parts of starch per 100 parts of prepolymer. The starch can be corn starch, wheat starch, tapioca starch, rice starch, or a starch-containing material such as flour.

The following examples illustrate our invention.

EXAMPLE 1

A prepolymer was prepared by mixing 12.1 grams of glycol glycoside polyoxypropylene ether having a hydroxyl number of 422 (made precisely in accordance with Example 9 of U.S. Patent No. 3,165,508) and 27.9 grams of toluene diisocyanate, and heating at 70° C. for 30 minutes. To the prepolymer was added 60 grams of starch and the mixture stirred continuously while heating to 100° C. The pastelike mixture was then poured into cylindrical molds and subjected to a pressure of 10,000 p.s.i. for 2 hours at 120° C. The resulting highly cured polyurethane resin had a compression strength of 19,000 p.s.i., a flexural strength of 3,770 p.s.i., and a Shore D hardness of 85. The molded cylinders were readily machined on a lathe to provide attractive rods that could be painted if desired.

EXAMPLE 2

A prepolymer was prepared by mixing 7.4 grams of the glycol glycoside polyoxypropylene ether of Example 1 with 29.8 grams of a proprietary tolylene diisocyanate accompanied by heating at 70° C. for 30 minutes. To the prepolymer was added 62.8 grams of starch and the whole stirred and heated to 100° C. until pastelike. The mixture was then molded with a Carver press at a pressure of 10,000 p.s.i. and temperature of 120° C. for 2 hours. The hard, highly crosslinked polyurethane resin had a compression strength of 27,800 p.s.i., a flexural strength of 6,100 p.s.i. and a Shore D hardness of 90. It was easily machined to a smooth finish on a lathe.

EXAMPLE 3

A prepolymer was prepared by mixing 15.2 grams of the polyether of Example 1 with 34.8 grams of toluene diisocyanate and heating at 100° C. with stirring for 15–20 minutes. To the prepolymer was added 50 grams of starch and the whole stirred and heated to 100° C. until pastelike. The mixture was molded for 2 hours at 120° C. and 10,000 p.s.i. Compressive strength of the cured polyurethane resin was 22,000 p.s.i., flexural strength was 8,200 p.s.i., and the Shore D hardness was 90.

EXAMPLE 4

A prepolymer was prepared by mixing 78.0 grams of a polyoxyethylated glycol glycoside having a hydroxyl number of 72 with 34.8 grams of toluene diisocyanate. After the temperature of reaction rose to 60° C., the mixture was heated to 70° C. and stirred at that temperature for 30 minutes. To 10 grams of this mixture then was added 10 grams of starch and the whole stirred and heated at 100° C. until viscous. The mixture was molded for 2 hours at 120° C. and 10,000 p.s.i. pressure. The cured polyurethane elastomer resembled hard rubber in appearance and had a Shore D hardness of 55.

We claim:
1. A process for obtaining high pressure-molded solid polyurethane products having a Shore D hardness value of at least about 85 whereby said products can be smoothly machined to provide chair legs or small gears, said process comprising forming a moldable paste by reacting about 1.5 parts by weight of starch at 100° C. with 1 part by weight of a prepolymer formed by stirring for about 15–30 minutes at not above 70° C. a reaction mixture consisting of a glycol glycoside polyoxypropylene ether having a hydroxyl number of about 420 and about 2.3 parts based on the weight of the said ether of an organic diisocyanate, and then subjecting the so produced paste to about 2 hours of molding at a temperature of 120° C. and at a pressure of 10,000 p.s.i.

References Cited

UNITED STATES PATENTS

| | | | |
|---|---|---|---|
| 2,908,657 | 10/1959 | Boggs | 260—9 |
| 3,165,508 | 1/1965 | Otey et al. | 260—210 |

OTHER REFERENCES

Boggs: Chem. Abstracts, 54: 20276f, "Synthetic Rubber and Leather."

WILLIAM H. SHORT, *Primary Examiner.*

E. M. WOODBERRY, *Assistant Examiner.*